United States Patent [19]

Okura et al.

[11] Patent Number: 5,461,444
[45] Date of Patent: Oct. 24, 1995

[54] LENS HOLDING STRUCTURE

[75] Inventors: Zenichi Okura; Shinsuke Kohmoto, both of Tokyo, Japan

[73] Assignee: Asahi Kogaku Kogyo Kabushiki Kaisha, Tokyo, Japan

[21] Appl. No.: 230,516

[22] Filed: Apr. 20, 1994

[30] Foreign Application Priority Data

Apr. 21, 1993 [JP] Japan .................. 5-020653 U

[51] Int. Cl.⁶ .................................................. G03B 17/00
[52] U.S. Cl. .................................... 354/286; 359/819
[58] Field of Search ................... 354/286, 195.1; 359/819, 820, 821, 822, 823, 830

[56] References Cited

U.S. PATENT DOCUMENTS

| | | | |
|---|---|---|---|
| 4,668,047 | 5/1987 | Okura | 359/820 |
| 5,117,311 | 5/1992 | Nomura | 359/819 |
| 5,249,082 | 9/1993 | Newman | 359/819 X |

Primary Examiner—Howard B. Blankenship
Attorney, Agent, or Firm—Sandler, Greenblum & Greenblum

[57] ABSTRACT

A lens holding structure used in a camera is provided having a rectangular photographing aperture. The lens holding structure includes a lens and a lens holding member for holding a lens. The lens is formed having a pair of flat surfaces, parallel to each other, and parallel to a longitudinal boundary of the photographing aperture. The lens holding member has a lens holding sleeve and a pair of lens engaging arms. When the lens is fitted into the lens holding sleeve, the lens engaging arms contact the pair of flat surfaces of the lens.

9 Claims, 3 Drawing Sheets

LENS HOLDING STRUCTURE

BACKGROUND OF THE INVENTION

The present invention relates to a lens holding structure for a camera.

Conventionally, a lens used in a camera has a circular shape. This circular lens is inserted into a circular opening of a lens holding sleeve, and held in place by a pressing member. Alternatively, the lens may be caulked to the lens holding sleeve. However, this structure causes the diameter of the lens holding sleeve to be larger than the maximum diameter of the lens. Accordingly, it is difficult to reduce the size of the lens holding structure and therefore, the camera itself.

SUMMARY OF THE INVENTION

It is therefore an object of the present invention to provide a lens holding structure which is capable of securely holding the lens, while minimizing the size of the lens holding structure.

According to the present invention, there is provided a lens holding structure comprising a lens and a lens holding member used for holding the lens. The lens holding structure employed in a camera has a rectangular photographing aperture.

The lens includes a peripheral surface having a pair of flat sections, parallel to each other, and parallel to a longitudinal boundary of the photographing aperture.

The lens holding member includes a lens receiving portion into which the lens is inserted, and a pair of lens engaging members engaging the pair of flat surfaces of and lens, when and lens is inserted into the lens receiving portion.

DESCRIPTION OF THE EMBODIMENTS

Figure 1:
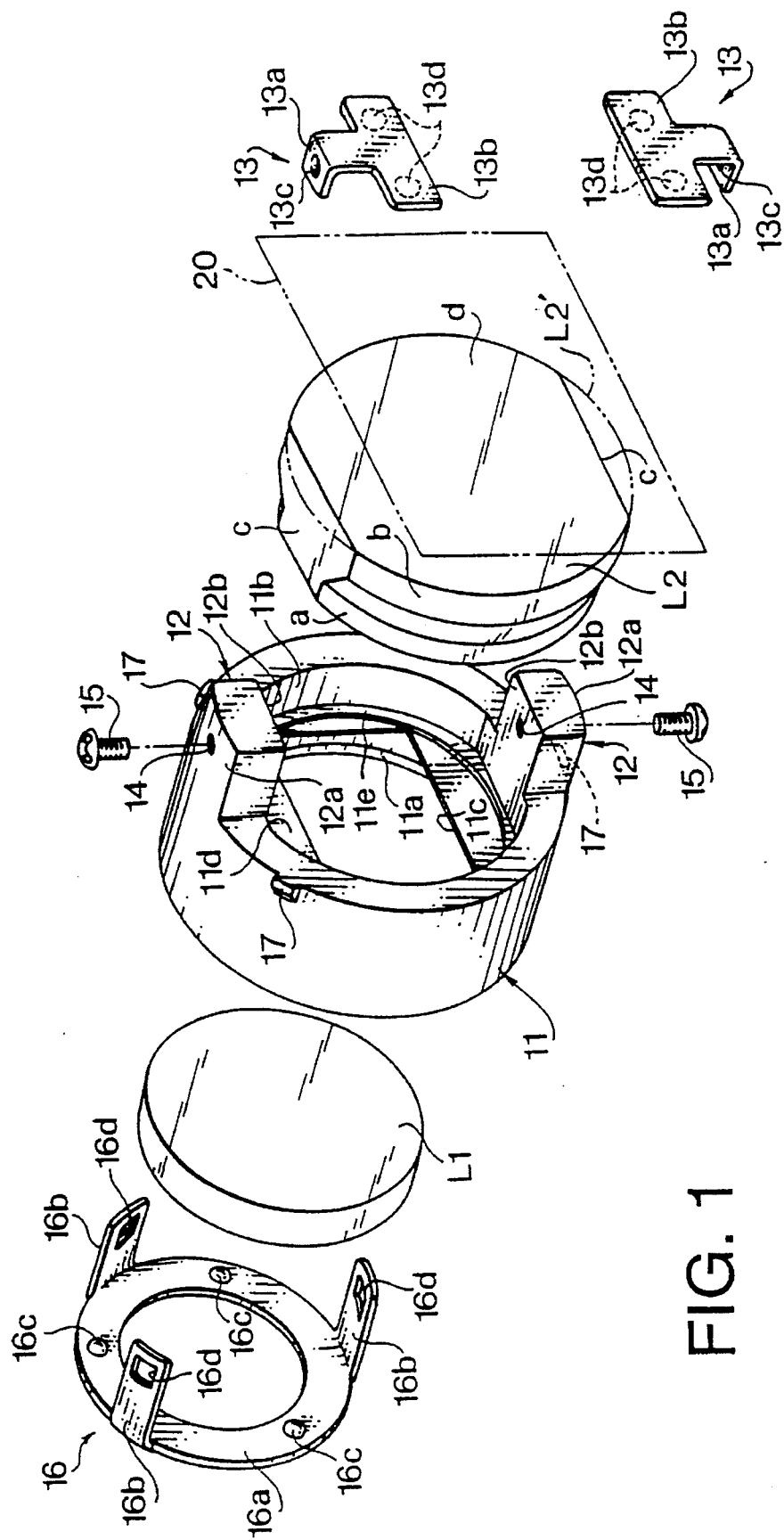
FIG. 1 shows an exploded perspective view of the lens holding struture embodying the invention.

FIG. 1 shows an exploded perspective view of the lens holding structure adapted for use in a zoom lens system of a compact camera. A pair of lenses L1 and L2, form the rearmost lens group of the zoom lens system. The diameter of the lenses L1 and L2 are larger than the diameters of other lenses or the frontmost lens groups (not shown), employed in the zoom lens system. A single lens for each of the lenses L1 and L2 is shown, however a lens group could be used for each lens.

The lenses L1 and L2 are held in a lens holding sleeve 11. The lens L1 is attached to the front of the lens holding sleeve 11 (i.e., towards an object to be photographed), while the lens L2 is attached to the rear of the lens holding sleeve 11 (i.e., towards an image to be formed through a photographing aperture).

Lens L1 is a circular shaped lens, while lens L2 is substantially oval shaped. More specifically, lens L2 is formed with a small diameter portion a and a large diameter portion b. The upper and lower surfaces of portions a and b are flat and joined to form surface c. Surface c is formed parallel to the longitudinal (i.e., top and bottom) boundaries of the photographing aperture 20. Since the photographing aperture 20 (and therefore the exposed image on a film plane, not shown) is rectangular, the removal of the sections of lens L2, as described above, will have no effect on the image that is formed on the film plane through the zoom lens system.

The lens L2 can be made of glass or plastic. A glass lens requires grinding in order to form the portions a and b such that each portion has a different diameter, as well as the flat surfaces c. A plastic lens having these dimensional characteristics can be formed by molding.

Line L2' represents the circumference of the portion b if the lens were circular instead of oval.

The lens holding sleeve 11 has a circular stepped portion 11a into which lens L1 is inserted. Lens L1 is prevented from moving towards lens L2 by the stepped portion 11a. A light shielding wall 11d is provided between the circular stepped portion 11a and an oval stepped portion 11b, in the lens holding sleeve 11. The light shielding wall 11d has an opening 11c to allow light to pass through. Lens L2 is inserted into the oval stepped portion 11b.

The oval stepped portion 11b has a pair of lens support arms 12 formed at the top and bottom thereof. The outer peripheral surface 12a of the lens support arm 12 is flush with the outer surface of the lens holding sleeve 11. The planar inner surface 12b of the lens support arm 12 is contiguous with the flat portion of the oval shaped inner surface of the stepped portion 11b, as shown in FIG. 1. A threaded hole 14 is formed through each lens engaging arm 12, to secure a screw 15. The screw 15 secures a lens holding bracket 13 to the engaging arms 12.

A lens holding bracket 13 has a bent T-shape, and consists of an attaching portion 13a and a lens pressing portion 13b. The lens pressing portion 13b is slightly elastic and can be moved relative to the attaching portion 13a. The lens pressing portion 13b has protrusions 13d which abut the surface d of the lens L2, when the lens system is assembled. Thus, the lens pressing portion 13b is aligned substantially flush with the rear surface d of the lens L2.

A lens engaging ring 16 consists of a support ring 18a, lens supporting arms 16b, and protrusions 16c, for abutting the front surface of the lens L1. The lens supporting arms 16b are slightly elastic and can be moved relative to the support ring 16a. Engaging holes 16d are formed through each lens supporting arm 16b, thereby engaging a hook 17 formed on the outer surface of the lens holding sleeve 11.

When the lens system shown in FIG. 1 is assembled, the lens L1 is inserted into the circular stepped portion 11a of the lens holding sleeve 11. Then the lens engaging ring 16 is moved towards the lens holding sleeve 11 such that the protrusions 16c abut the front surface of the lens 11c, and the holes 16d engage the engaging hooks 17. This movement of the lens engaging ring 16 requires that the lens supporting arms 16b are pushed outward, to allow the engaging holes 16d to engage the engaging hook 17.

Figure 4:
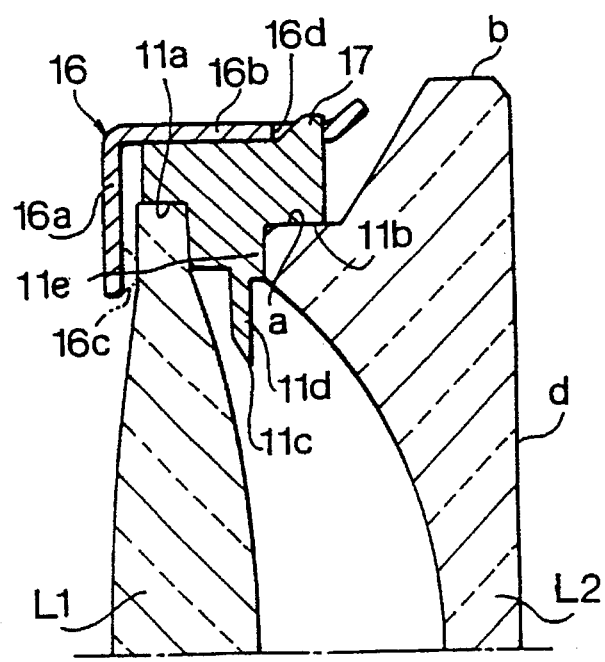
FIG. 4 is a cross-sectional view of the lens holding structure, taken along the line B—B of FIG. 2.

FIG. 4 shows the lens engaging ring 16 securing the lens L1 to the lens holding sleeve 11. The lens L1 is inserted flush with the sides of the circular stepped portion 11a by the pressing action of the protrusions 16c of the engaging ring 16. When the lens L1 is completely inserted, the lens L1 will be aligned such that its optical axis is coincident with the photographing optical axis.

As shown in FIG. 1, the portion a of the lens L2 is inserted in the oval stepped portion 11b of the lens holding sleeve 11. The lens holding brackets 13 are secured to the engaging arms 12 by the screw 15 to secure the lens L2 to the lens holding sleeve 11.

Figure 3:
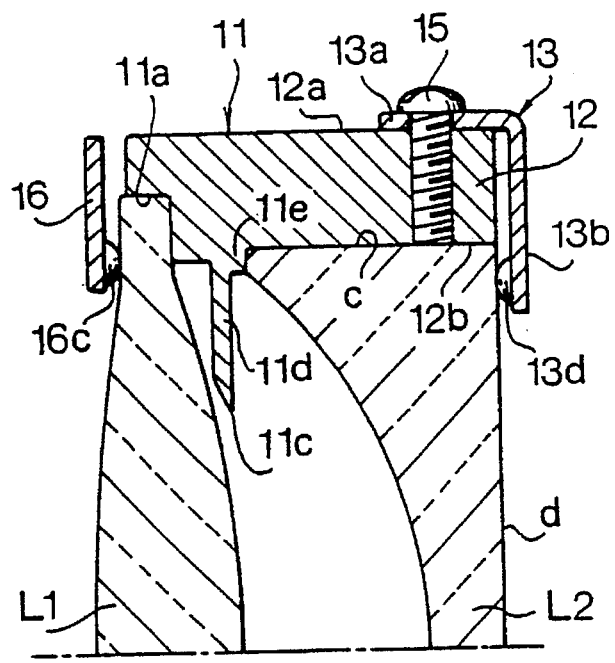
FIG. 3 is a cross-sectional view of the lens holding structure, taken along the line A—A of FIG. 2.

FIG. 3 shows the lens L2 secured to the lens holding sleeve 11. The flat surface c of the lens L2 is flush with the surface 12b of the engaging arms 12. The lens L2 is pressed against the inside wall 11e, which is perpendicular to the inner surface of the oval stepped portion 11b, by the protrusions 13d of the pressing portion 13b of the lens holding bracket 13. As a result, after the lens L2 is completely inserted, the lens L2 will be aligned such that its optical axis is coincident with the photographing optical axis.

Therefore, by removing the sections of the lens L2 such that its top surface and bottom surface are flat, the lens L2 can be secured to the lens holding sleeve 11 that has a diameter that is smaller than the largest diameter of the lens L2.

Figure 2:
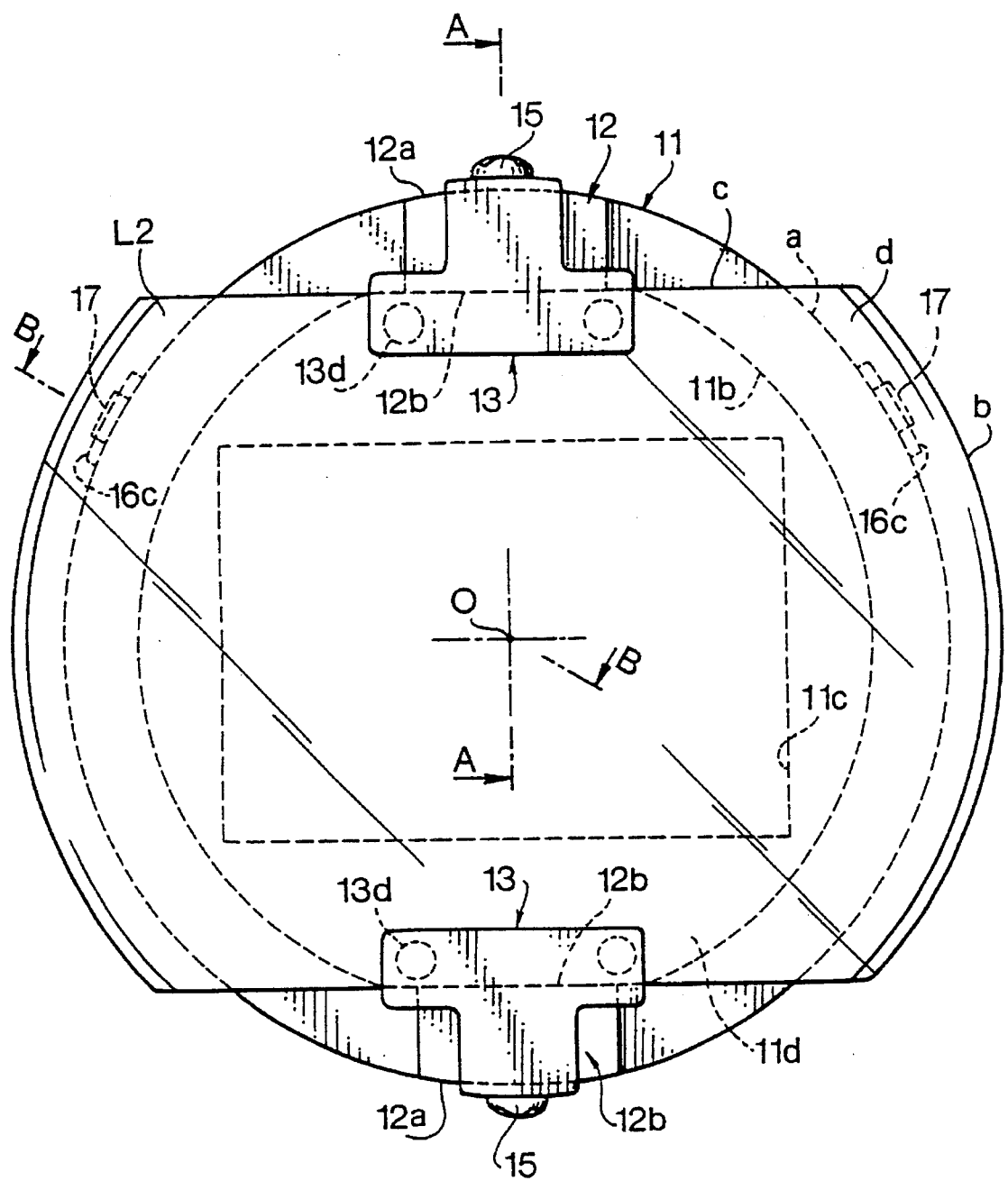
FIG. 2 shows a rear view of the lens holding structure of FIG. 1 when the lens is assembled.

As shown in FIG. 2, the lens engaging arms 12 and the lens holding brackets 13 are positioned on the surface c of the lens L2, and are installed within the space (defined by surface c and line L2') that would have been occupied by the lens, if the sections of the lens had not been cut off. The remaining space can be used to provide a path for a flexible circuit board or wires that connect circuits used with the lens hardware, to a main camera control unit, not shown. For instance, a zoom code plate and brushes which contact the zoom code plate, for detecting the focal length of the zoom lens system, could be placed in this space.

In the above embodiment, as the largest lenses are positioned at the rearmost side of the zoom lens system, an aperture mechanism and/or a shutter block can be placed around the front lens group, without increasing the size of zoom lens system.

In the above described embodiment, both the large diameter portion and the small diameter portion of the lens L2 have a pair of sections cut off. Alternatively, the large diameter portion of lens L2 may have a pair of sections cut off, while the small diameter portion is circular shaped. In this alternate embodiment, the stepped portion 11b of the lens holding sleeve 11, would have a circular shape.

As described above, by taking into consideration that the picture image formed through the zoom lens system is rectangular, the section of a circular lens which does not relate to image formation, is cut off, to form an oval shape having a pair of flat surfaces which are parallel to the longitudinal edges of the picture image. Further, a lens pressing portion which engages the pair of flat surfaces of the oval lens, is formed on a holding member, so that a space is formed at the outer side of the pair of flat surfaces of the oval lens. This results in the size of the lens holding structure and therefore the camera, being reduced.

The present disclosure relates to subject matter contained in Japanese Utility Model Application HEI 5-020653, filed on Apr. 21, 1993, which is incorporated in its entirety, by its reference herein.

What is claimed is:

1. A lens holding structure comprising a lens and a lens holding member used for holding said lens, said lens holding structure employed in a camera having a rectangular photographing aperture, wherein said lens comprises a peripheral surface having a pair of flat sections, parallel to each other, and parallel to a longitudinal boundary of said photographing aperture; and wherein said lens holding member comprises:
a lens receiving portion into which said lens is inserted; and
a pair of lens engaging members engaging said pair of flat surfaces of said lens, when said lens is inserted into said lens receiving portion.

2. The lens holding structure according to claim 1, wherein said lens holding member is cylindrically shaped.

3. The lens holding structure according to claim 1, wherein said lens has a large diameter portion and a small diameter portion, said small diameter portion integrally formed to said large diameter portion, and wherein at least said large diameter portion has a top flat surface and a bottom flat surface.

4. The lens holding structure according to claim 1, wherein said lens has a large diameter portion and a small diameter portion, said small diameter portion integrally formed to said large diameter portion, and wherein each of said small diameter portion and said large diameter portion has a top flat surface and a bottom flat surface, said top flat surfaces being contiguous, forming one of said pair of flat sections of said peripheral surface of said lens, and said bottom surfaces being contiguous, forming another of said pair of flat sections of said peripheral surface of said lens.

5. The lens holding structure according to claim 4, wherein a surface of said small diameter portion of said lens contacts a surface of said lens holding member, said surface of said small diameter portion and said surface of said lens holding portion facing each other, when said lens is inserted into said lens holding member.

6. The lens holding structure according to claim 4, wherein said lens holding member has a stepped portion, into which said small diameter portion of said lens is inserted, wherein an inside circumferential surface of said stepped portion is substantially oval shaped.

7. The lens holding structure according to claim 6, which further comprises a pair of lens pressing brackets for pressing a surface of said large diameter portion of said lens, such that said lens is pressed towards said stepped portion of said lens holding member, wherein said lens pressing brackets are attached to said lens engaging members.

8. The lens holding structure according to claim 1, wherein said camera is a zoom compact camera, and wherein said lens comprises a part of a zoom lens system employed in said zoom compact camera.

9. The lens unit according to claim 4, wherein said lens is integrally formed by molding.

* * * * *